US012024307B2

(12) United States Patent
Atkins et al.

(10) Patent No.: US 12,024,307 B2
(45) Date of Patent: Jul. 2, 2024

(54) METHOD AND SYSTEM FOR REGULATION OF SPEED AND POSITION OF A ROTOR IN WING-BORNE FLIGHT

(71) Applicant: Textron Innovations Inc., Providence, RI (US)

(72) Inventors: Brady Garrett Atkins, Euless, TX (US); Troy Cyril Schank, Keller, TX (US); Charles Eric Covington, Colleyville, TX (US); Carlos Alexander Fenny, Fort Worth, TX (US); Jonathan Toth, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 273 days.

(21) Appl. No.: 17/721,890

(22) Filed: Apr. 15, 2022

(65) Prior Publication Data

US 2023/0117303 A1    Apr. 20, 2023

Related U.S. Application Data

(63) Continuation-in-part of application No. 17/501,071, filed on Oct. 14, 2021, now Pat. No. 11,584,520.

(51) Int. Cl.
*B64C 11/00* (2006.01)
*B64C 11/04* (2006.01)
*B64D 31/06* (2006.01)

(52) U.S. Cl.
CPC ............ *B64D 31/06* (2013.01); *B64C 11/002* (2013.01); *B64C 11/04* (2013.01)

(58) Field of Classification Search
CPC ....... B64C 27/001; B64C 27/57; B64C 27/82; B64C 2027/002; B64C 2027/004; B64C 11/002; B64C 11/04; B64D 31/06
See application file for complete search history.

(56) References Cited

U.S. PATENT DOCUMENTS

| | | | |
|---|---|---|---|
| 3,977,812 A * | 8/1976 | Hudgins | ................ B64C 27/12 416/169 R |
| 5,853,144 A | 12/1998 | Vincent | |
| 10,875,640 B2 | 12/2020 | Speller et al. | |
| 2006/0266153 A1* | 11/2006 | Clary | ..................... F16F 15/22 188/266 |
| 2013/0183169 A1 | 7/2013 | Buono et al. | |
| 2015/0114772 A1* | 4/2015 | Babu | .................... F16D 65/123 188/218 XL |
| 2015/0298818 A1* | 10/2015 | Garcia | .................... B64C 27/82 244/17.27 |
| 2018/0050796 A1 | 2/2018 | Wittmaak | |
| 2019/0016451 A1 | 1/2019 | Ehinger et al. | |
| 2019/0033862 A1 | 1/2019 | Groden et al. | |

(Continued)

OTHER PUBLICATIONS

Sobel, James, et al.; "Method and System for Regulation of Speed and Position of a Rotor in Wing-Borne Flight"; U.S. Appl. No. 17/501,071, filed Oct. 14, 2021; 18 pages.

*Primary Examiner* — Tye William Abell
(74) *Attorney, Agent, or Firm* — Bradley Arant Boult Cummings LLP (57) ABSTRACT

A rotor-regulation system includes a rotor that includes a plurality of rotor blades, a rotor mast operable to drive the rotor, and a rotor disc-brake system operable to modulate rotation of the rotor mast.

19 Claims, 5 Drawing Sheets

(56) References Cited

U.S. PATENT DOCUMENTS

| | | |
|---|---|---|
| 2019/0071172 A1 | 3/2019 | Caldwell |
| 2019/0136927 A1* | 5/2019 | Prouzet ................. F16D 55/226 |
| 2019/0241251 A1* | 8/2019 | Atkins .................... F16K 11/20 |
| 2019/0248481 A1* | 8/2019 | Speller ................ B64C 29/0033 |
| 2020/0070996 A1* | 3/2020 | Hefner .................... B64C 27/82 |
| 2022/0119102 A1* | 4/2022 | Shaanan ................. B64C 27/82 |
| 2022/0411050 A1* | 12/2022 | Lavallee ................. B64C 27/56 |
| 2023/0234703 A1* | 7/2023 | Brown ................... B64C 11/04 |
| | | 244/7 R |
| 2023/0348088 A1* | 11/2023 | Besse ...................... B64C 11/28 |

* cited by examiner

METHOD AND SYSTEM FOR REGULATION OF SPEED AND POSITION OF A ROTOR IN WING-BORNE FLIGHT

CROSS-REFERENCE TO RELATED APPLICATIONS

This patent application is a continuation-in-part of U.S. patent application Ser. No. 17/501,071, filed on Oct. 14, 2021. U.S. patent application Ser. No. 17/501,071 is incorporated herein by reference.

TECHNICAL FIELD

The present disclosure relates generally to regulation of speed and position of a rotating element and more particularly, but not by way of limitation, to regulation of speed and position of a rotor in wing-borne flight.

BACKGROUND

This section provides background information to facilitate a better understanding of the various aspects of the disclosure. It should be understood that the statements in this section of this document are to be read in this light and not as admissions of prior art.

Rotor indexing of rotorcraft is a term used to describe turning of rotor blades to a predetermined azimuthal position. Rotor indexing is not uncommon in rotorcraft on the ground, such as, for example, the Bell V-22 OSPREY VTOL rotorcraft, in which rotor indexing is part of a rotor-blade fold and wing-stow sequence.

However, rotor indexing while the rotorcraft is in wing-borne flight presents particular challenges. For example, early attempts at in-flight indexing used a system in which a peg was dropped in a hole of a rotor-regulation system to stop and position the rotor. This approach generated high-impact loads to the rotor-regulation system that could cause structural issues such as fatigue and limited component life.

SUMMARY

This summary is provided to introduce a selection of concepts that are further described below in the detailed description. This summary is not necessarily intended to identify key or essential features of the claimed subject matter, nor is it intended to be used as an aid in limiting the scope of claimed subject matter.

A rotor-regulation system includes a rotor that includes a plurality of rotor blades, a rotor mast operable to drive the rotor, and a rotor disc-brake system operable to modulate rotation of the rotor mast.

A rotor disc-brake system includes a disc brake operable to modulate rotation of a rotor mast, a transducer operably coupled to the rotor mast, and a computer operably coupled to the transducer.

A method of modulating rotation during wing-borne flight of a rotor includes a plurality of rotor blades includes receiving information indicative of at least one of a position and rate of angular rotation of a rotating rotor coupled to a rotor mast and responsive to the received information, modulating rotation of the rotor via a disc-brake system coupled to the rotor mast.

DETAILED DESCRIPTION

Various embodiments will now be described more fully with reference to the accompanying drawings. The disclosure may, however, be embodied in many different forms and should not be construed as limited to the embodiments set forth herein.

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

Blade feathering is a term used to describe changing rotor blade angle or pitch. Blade feathering influences the rotor blade's angle of attack. A rotor blade feathers along its longitudinal axis. Blade feathering can increase the angle of pitch of the rotor blade to a fully feathered state in which the angle of attack is parallel to an airstream encountered by the rotor. Increasing the blade feathering in this way reduces aerodynamic moments that remain imparted on the rotor following, for example, engine failure in flight.

A blade feathering angle is in most cases ideally directly into the airstream in order to stop the rotation of the rotor when fully feathered; as such, if the blade feathering angle is not ideal, some rotation of the rotor will occur. Given a residual non-ideal blade feathering angle, aircraft angle of attack, or residual engine idle torque, the rotor will come to an equilibrium rotation speed that reduces rotor net torque to zero. If the rotating rotor speed is mechanically arrested through for example, a brake, residual aerodynamic forces on the rotor will increase as the RPM changes from equilibrium. At the fully-stopped condition, a significant amount of static torque can be generated by aerodynamic loads on the rotor blades.

If rotor rotation occurs due, for example, to a residual non-ideal blade feathering angle, stopping the rotor increases static rotor torque. Such increased rotor torque can be relatively large even at low rotor rotational speeds due, for example, to the size of the rotor.

Various embodiments address the problem of how to arrest and index a rotor system in wing-borne flight after feathering of rotor blades. Thus, in various embodiments, the rotor blades can be folded into a stow lock position after the rotor has been positioned in a correct indexing location. Transition from turbo-prop powered flight to turbo-fan powered flight is a typical application of rotor indexing and stowage as discussed herein.

Even when rotor blades have been fully feathered during wing-borne flight, a feathering angle is often not perfect, such that residual rotation of the rotor can remain. As such, high torque loads can build up if the rotor is arrested during indexing. Therefore, a compact and efficient way to achieve rotor indexing that takes advantage of the prevailing rotor loads is desirable. Accomplishing of rotor stop/fold during flight is particularly desirable, although not necessarily limited to, high-speed VTOL rotorcraft.

Figure 1:
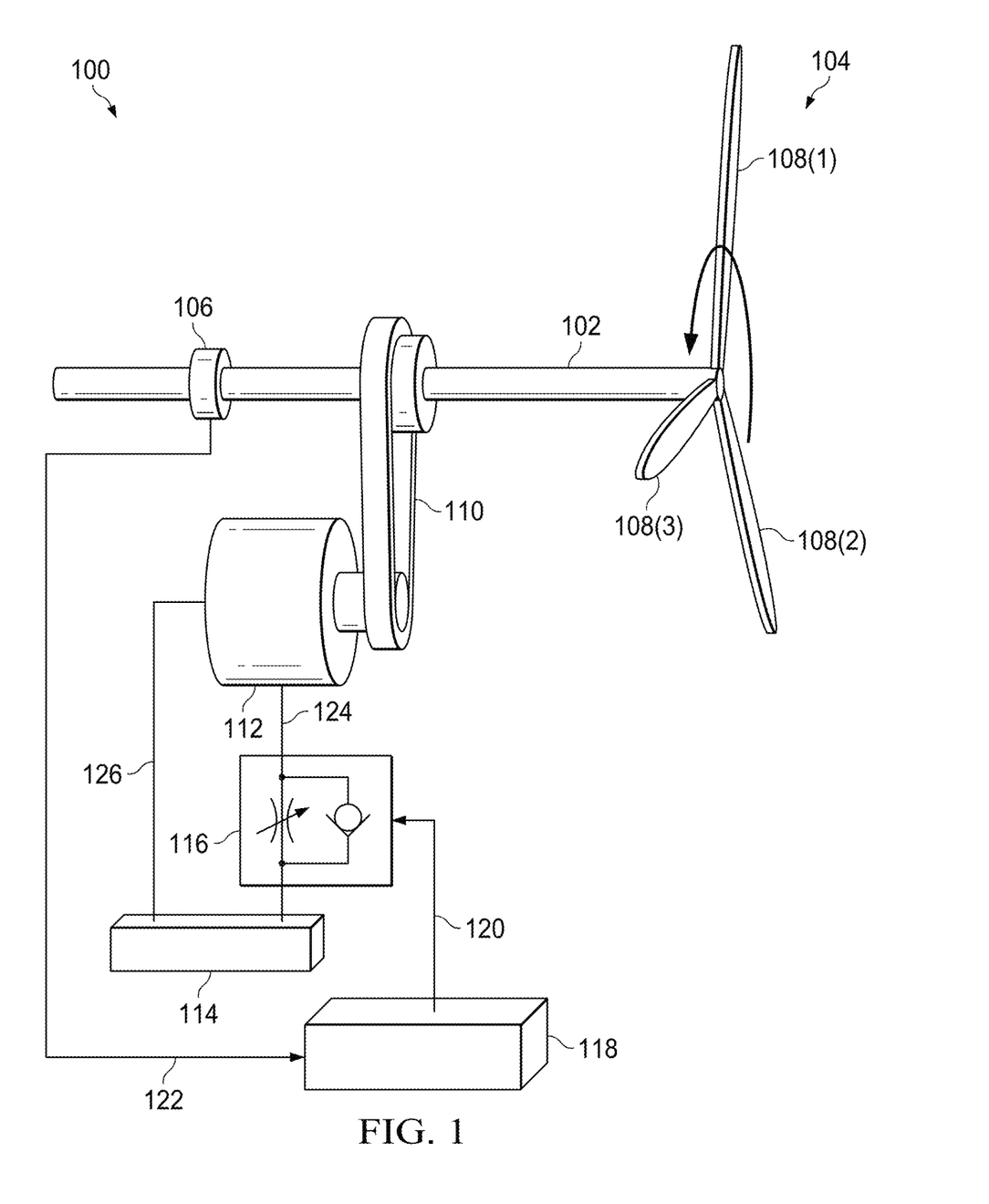
FIG. 1 is a diagram that illustrates a rotor-regulation system.

Referring now to the FIGURES, FIG. 1 is a diagram that illustrates a rotor-regulation system 100. The rotor-regulation system 100 as shown is an energy-absorbing system that can be used to modulate rotation of one or more rotors and includes a mast 102 by adjusting a load on the rotor-regulation system 100 to slow rotation of the one or more rotors.

A rotor 104 is coupled to the mast 102, the mast 102 providing rotation to the rotor 104. A rotor transducer 106, which outputs data indicative of at least an azimuthal position of the rotor 104, is coupled to the mast 102.

The rotor 104 as shown is comprised of three rotor blades, which rotor blades are illustrated with reference numerals 108(1)-(3). Those having skill in the art will appreciate that a different number of rotor blades can be employed without departing from principles of the invention. A drive belt 110 is coupled to the mast 102. Rotation of the mast 102 causes the drive belt 110 to power a mechanically driven hydraulic pump 112.

Although FIG. 1 illustrates the drive belt 110, a gear box or other drive mechanism could be used to interconnect the mast 102 and the mechanically driven hydraulic pump 112. In similar fashion, although not explicitly depicted in FIG. 1, various clutching mechanisms could be employed, for example, so that the mechanically driven hydraulic pump 112 doesn't need to turn at high rotor speeds, but rather only after the rotor blades have been feathered and rotor speeds have been reduced. Moreover, it should be understood that a transmission could be utilized, for example, to vary a gear ratio at different speeds, particularly if the mechanically driven hydraulic pump 112 is used to generate hydraulic energy at normal rotor speeds. In a typical embodiment, the mechanically driven hydraulic pump is a fixed-displacement hydraulic pump.

A fluid reservoir 114, a throttling valve 116, and a computer 118 are also illustrated. A valve-control line 120 is connected between the computer 118 and the throttling valve 116, the valve-control line 120 permitting the computer 118 to control opening and closing of the throttling valve 116. Although FIG. 1 illustrates the computer 118 as being operably interconnected with the single rotor 104, it will be understood that, in some embodiments, the computer 118 controls two or more rotors 104, for example, in a rotorcraft that employs multiple rotors 104.

Also illustrated is a transducer-signal line 122 that provides signal(s) indicative of at least the position of the rotor 104 to the computer 118. A hydraulic-fluid outlet line 124 is connected between the mechanically driven hydraulic pump 112 and the fluid reservoir 114 via the throttling valve 116. A hydraulic-fluid return line is connected between the fluid reservoir 114 and the mechanically driven hydraulic pump 112 and provides return hydraulic fluid to the mechanically driven hydraulic pump 112. In a typical embodiment, the fluid reservoir 114 helps provide extra fluid to account for leakage. In some embodiments, extra fluid to account for losses can be sourced via another hydraulic system.

In a typical embodiment, the rotor-regulation system 100 does not provide directional control but rather only braking force on the rotor 104. In other words, in such an embodiment, the rotor-regulation system 100 merely serves to control rotation of the rotor 104 in a given direction and does not impart power to the rotor 104 so as to cause the rotor 104 to rotate in an opposite direction. Thus, in order to control the rotation of the rotor 104 prior to indexing the rotor 104, a typical embodiment only has the ability to place a varying braking force on the rotor via controlled operation of the throttling valve 116. The absence of directional control tends to allow the rotor-regulation system 100 to be simpler in design, lighter in weight, and more robust than a comparable system that can directionally control the rotor 104. In other embodiments, the rotor-regulation system 100 is operable to recognize rotor-rotation direction and successfully index and bias the rotor 104 accordingly in either rotational direction.

Factors that influence the rotational speed of the rotor 104 include the blade feathering angle and residual engine torque driving the mast 102. In a typical use case, the rotor 104 rotates in a particular direction (e.g., counter-clockwise) and the rotor-regulation system 100 controls the speed and position of the rotor 104 as it spins in that direction. As noted above, a system that cannot make the rotor 104 turn in the opposite direction tends to be simpler and less prone to component failure under most circumstances.

An algorithm can be employed by the computer 118 to cause the rotor 104 to stop at a desired azimuthal position for rotor indexing. In a typical embodiment, blade-feathering bias may be determined so as to cause the rotor 104 to resist residual engine torque such that undesirable total net rotor torque that the indexing system must overcome is minimized. Flow restriction of the mechanically driven hydraulic pump 112 is used to modulate rotational speed of the rotor 104. The flow restriction is controlled via the computer 118, which monitors a signal from the rotor transducer 106 and performs an algorithm to control the speed and position of the rotor 104. The algorithm monitors, for example, the position and speed of the rotor 104 in order to control the rotor rotation and selectively controls the throttling valve 116 coupled to the mechanically driven hydraulic pump 112 to regulate the speed and final position of the rotor 104 prior to indexing. In a typical embodiment, a load on the mechanically driven hydraulic pump 112 is changed in order to vary an amount of braking force the mechanically driven hydraulic pump 112 exerts on the rotating rotor 104. If the hydraulic flow restriction on the mechanically driven hydraulic pump 112 is kept relatively high, relatively greater resistance on the rotating rotor 104 from the mechanically driven hydraulic pump 112 will remain; in contrast, if the flow restriction is decreased by opening of the throttling valve 116, the mechanically driven hydraulic pump 112 exerts relatively less resistance on the rotating rotor 104 and thus allows the rotor 104 to rotate more freely.

In a typical embodiment, the algorithm employed by the computer 118 only addresses indexing of the rotor 104 and does not address an amount of blade feathering of the rotor 104. In such an embodiment, as the rotor blades 108(1)-(3) are feathered, the rotor blades 108(1)-(3) hit respective hard stops that hold the rotor blades 108(1)-(3) at the full limit of their feather travel capability; however, there is some variability in the final blade feathering angles due to mechanical rigging and structural twist and residual torque applied to the rotor 104 due to flight conditions such as aircraft incidence and air disturbances. When the rotor blades 108(1)-(3) are at the fully feathered positions, control of the final blade-feathering angle is often impractical; therefore, controlling the mechanical rotation of the rotor blades 108(1)-(3) and not the aerodynamic blade feathering is a solution that does not require that the blade feathering angle be precisely controlled when the rotor blades 108(1)-(3) approach a maximally feathered state. In addition, biasing of the rotor could be achieved via an aerodynamic surface, such as, for example, movable trim tabs on the blades, active blade twist, individual blade control, adjusting lock-pin mount displacement from a mast structure, etc. The biasing could be done actively or statically via one or both of design bias offsets and rigging/shimming.

The rotor-regulation system 100 inherently has losses, such as, for example, internal leakage losses in the mechanically driven hydraulic pump 112. In such cases, a supplemental system (not shown) can be utilized that applies additional pressure and hydraulic-fluid flow to the rotor-regulation system 100 to overcome those losses. A typical supplemental system would include a separate pump that receives power from an electrical or other power source other than the mast 102.

In many cases, the throttling valve 116 generates a considerable amount of heat during operation. Moreover, when the rotor 104 rotates at a relatively high rate and a regulation or modulation process of the rotating rotor 104 is commenced, a relatively high fluid flow rate out of a fixed-displacement implementation of the mechanically driven hydraulic pump 112 will be available to control rotation of the rotor 104; however, as braking continues, it will become more difficult for the rotor-regulation system 100 to control rotation of the rotor 104 due to limitations of the fixed-displacement implementation of the mechanically driven hydraulic pump 112 when same is sized for an initial stage of the braking process.

To address these concerns, a variable-displacement implementation of the mechanically driven hydraulic pump 112 that optimizes pump torque output to match the rotor speed as the rotor 104 rotation slows can be utilized. One advantage of a variable displacement pump is that the variable displacement pump could be continuously attached to a drive shaft when a swashplate angle is zeroed out in contrast to a fixed displacement pump, which would likely need to be de-clutched at higher rotor RPM. In a typical embodiment, the variable displacement pump could take different forms.

First, a variable displacement pump that actively regulates output pressure could use a variable flow restriction in similar fashion to a fixed displacement pump; however, the variable displacement pump, as the pump attempts to regulate the output pressure, decreasing the flow restriction serves to increase the flow demand. Increasing the flow demand increases the resistive load on the rotor. If the flow restriction is completely closed off, the pump will naturally zero the swashplate angle, which then allows the pump to be connected to the rotor at higher RPM.

Second, a variable displacement pump may have a fixed flow restriction where the swashplate angle is directly adjusted. Greater swashplates angles try to push more fluid through the fixed restriction, which serves to increase the resistive force on the rotor. Zeroing the swashplate angle would apply no resistive load on the rotor and allow the pump to be continuously attached at higher RPM.

Figure 2:
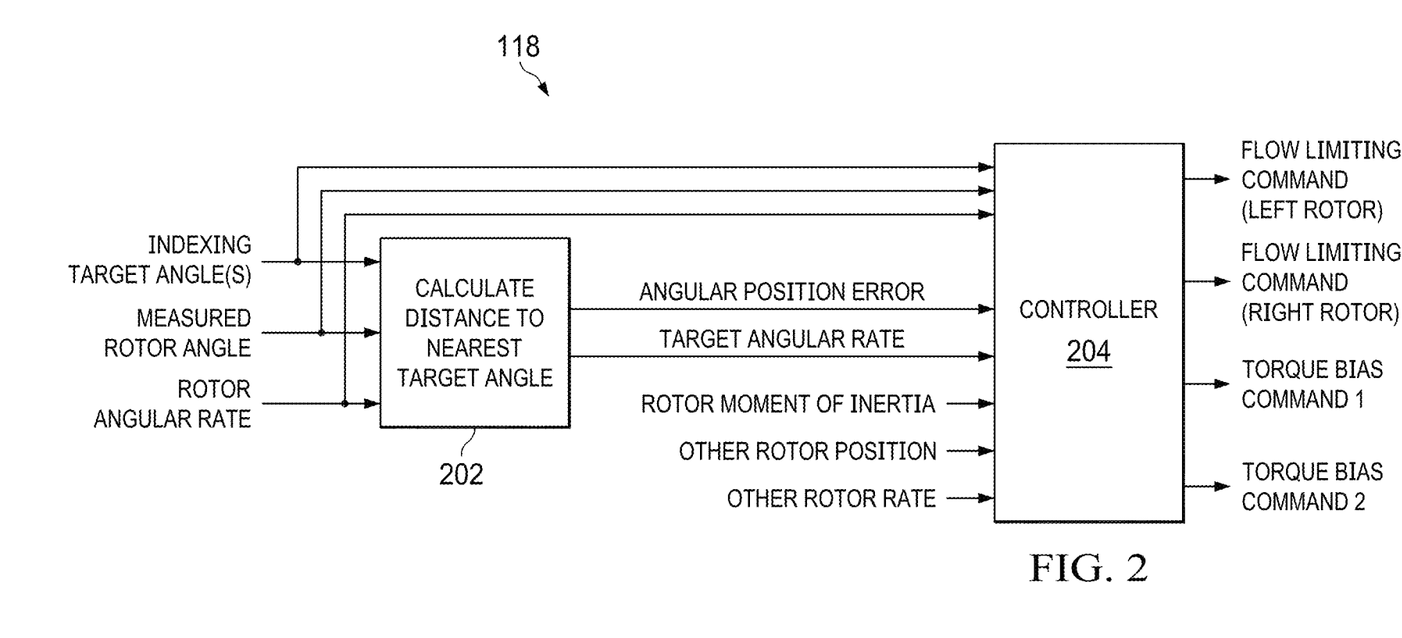
FIG. 2 is a functional block diagram that illustrates functionality performed by a computer of the rotor-regulation system of FIG. 1.

FIG. 2 is a functional block diagram that illustrates functionality performed by the computer 118 of the rotor-regulation system 100 of FIG. 1. As illustrated in FIG. 2, the computer 118 includes a distance-calculation engine 202 and a controller 204. The distance-calculation engine 202 operates to calculate a distance from a nearest indexing target angle to a current position of one or more of the rotors 104. Inputs to the distance-calculation engine 202 include one or more indexing target angles, the number of indexing target angles being dependent upon design of an indexing system within which the rotor 104 operates, and one or both of a measured angle of the rotor 104 and an angular rate of rotation of the rotor 104, the latter two inputs coming from the rotor transducer 106 via the transducer-signal line 122 in a typical embodiment. The angular rate of rotation of the rotor 104 may be derived or may be obtained by direct measurement. Each of the inputs to the distance-calculation engine 202 may also be input to the controller 204.

Outputs of the distance-calculation engine 202 include an angular position error, which is the difference between an angular position of the rotor 104 and the indexing target angle, and a target angular rate of rotation of the rotor 104. These outputs of the distance-calculation engine 202 are input to the controller 204. Other inputs to the controller 204 may include a moment of inertia of the rotor 104 as well as a position and rate of rotation of a second rotor 104 in embodiments that utilize multiple rotors 104, these inputs typically coming from the rotor transducer 106 via the transducer-signal line 122. In a two-rotor system, a second rotor would have its own transducer and signals. In a typical embodiment, the controller 204 would receive the angular position error and target angular rate from the first rotor, and make sure both rotor target angles match. In some embodiments in which multiple rotors 104 are used and an interconnect drive shaft is implemented, torsion zeroing may be achieved by the controller 204 monitoring the position of each rotor 104 and favoring a rate of rotation of a lagging rotor 104 and hindering a rate of rotation of a leading rotor 104.

The controller 204 outputs one or more flow limiting commands to the throttling valve 116, a flow limiting command being shown for each of a left and a right rotor 1044 in embodiments in which multiple rotors 104 are utilized. In some embodiments, rate of change of flow limiting may be employed in order to prevent inertia of the rotor 104 from causing pressure in the mechanically driven hydraulic pump 112 from exceeding a pre-defined threshold.

Also shown are torque bias commands, each of which can be designed to make adjustments to torque bias of the rotor blades 108 of a single rotor 104 or multiple rotors 104 depending upon design considerations. Torque biasing could be accomplished by counterbalancing residual engine torque via blade feathering. Other options to implement torque biasing may include an aerodynamic surface such a movable trim tabs on the rotor blades 108, active twist of the rotor blades 108, individual control of the rotor blades 108, and adjusting the portion of the feather-limiting hard stop from the mast structure. Static torque biasing could also be achieved via mechanically designed bias offsets, mechanical or electrical rigging, or mechanical shimming. Torque bias could also be accomplished, for example, by powering down a motor connected to the mast 102.

In a typical embodiment, the computer 118 can control the rotor 104 using the angular position error, the target angular rate of rotation, or both. For example, the computer 118 could adjust a flow-restriction command in continuous or discrete increments based on how close the rotor 104 is to a target angular position. A nearest target angle position may be missed if, for example, the rotor 104 is still rotating too fast when the rotor 104 reaches the target angular position. This could be due, for example, to aerodynamic spin-down of the rotor 104 upon reaching the target angular position.

In such a case, the target angular rotation rate may be increased to allow a rotational speed of the rotor 104 to re-accelerate until the rotor 104 again begins to approach the next target angular position. This would reduce the time needed for the rotor 104 to reach the next target angular position and tend to avoid the rotor 104 stopping rotating before reaching the next target angular position. In some cases, the computer 118 could not use angular rotation rate at all and could instead control the rotor 104 based on angular distance of the rotor 104 to the target angular position.

In particular embodiments, the computer 118 may perform one or more actions described or illustrated herein. In particular embodiments, one or more computer systems may provide functionality described or illustrated herein. In particular embodiments, hardware or encoded software running on one or more computer systems may perform one or more actions described or illustrated herein or provide functionality described or illustrated herein. Multiple computers could be used to distribute various functions and for purposes of redundancy.

Those having skill in the art will recognize that the concepts discussed herein can be implemented on aircraft of greatly varying sizes and configurations. Depending on those sizes and configurations, a mechanism for driving the mechanically driven hydraulic pump 112 other than the drive belt 110 may be employed such as, for example, a planetary gear system. In similar fashion, the mechanically driven hydraulic pump 112 need not necessarily be dedicated solely to regulation of rotation of the rotor 104 but could instead be used for other purposes as well, such as, for example, generating hydraulic power when no indexing operation is being undertaken. Moreover, different gear ratios and clutching could be used depending upon how the mechanically driven hydraulic pump 112 is to be used when not in use for regulation of rotation of the rotor 104. In addition, the valve-control line 120 and the transducer-signal line 122 can be wired or wireless dependent on design considerations.

Figure 3:
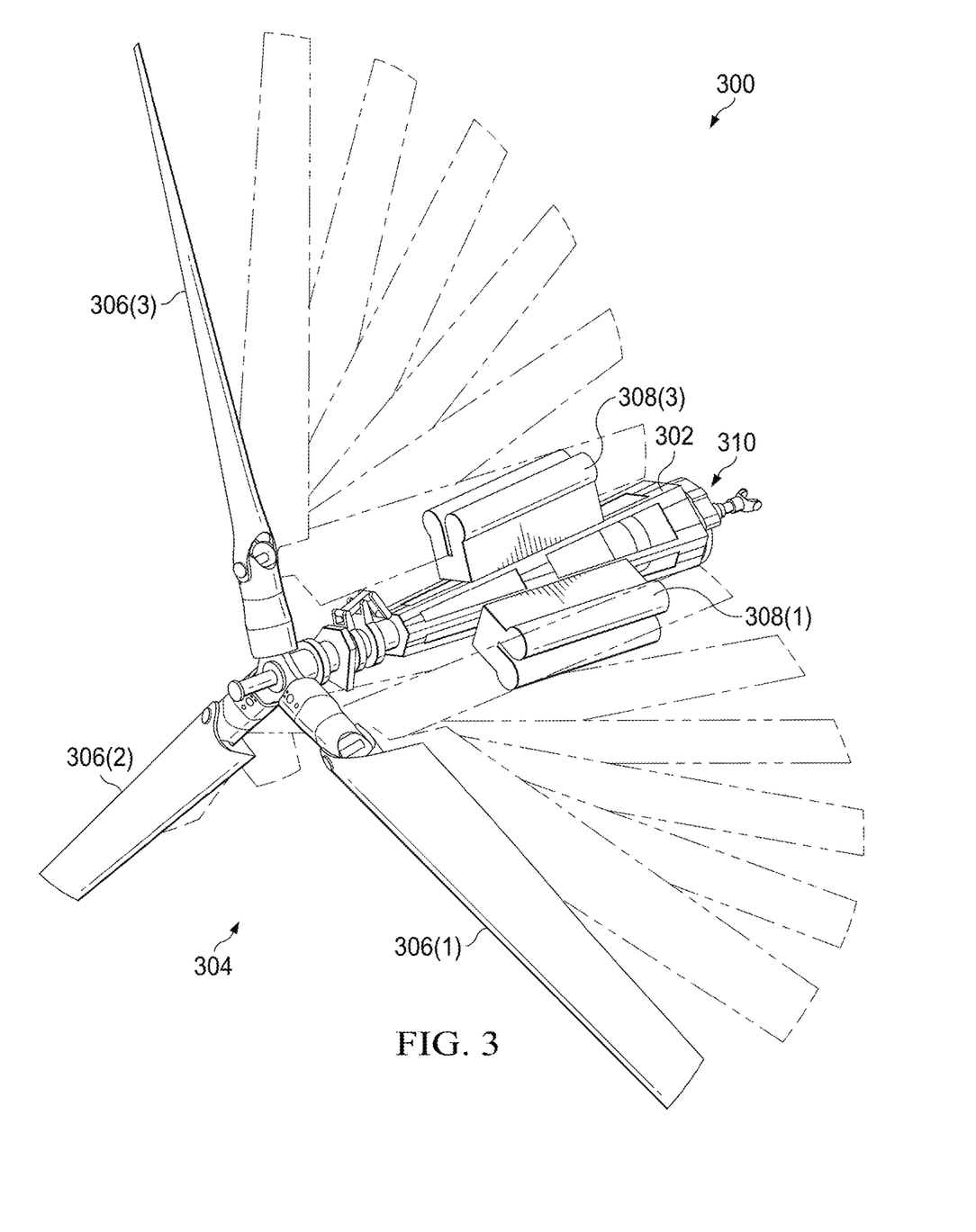
FIG. 3 illustrates a rotor-regulation system.

FIG. 3 illustrates a rotor-regulation system 300. The rotor-regulation system 300 includes a pylon 302. Inside the pylon 302 is a rotor mast coupled to an engine (not shown). The rotor mast is coupled to and supplies torque to a rotor 304. The rotor 304 includes rotor blades 306(1), 306(2), and 306(3). The rotor blade 306(1) and the rotor blade 306(3) are shown as in multiple positions as they are folding back adjacent to the pylon 302 and locked into place within slots of stow locks 308(1) and 308(3). The rotor blade 306(2) folds back adjacent to the pylon 302 and is locked into place in similar fashion, although the folding and locking are not illustrated in FIG. 3. A stow lock 308(2) is hidden from view in FIG. 3. Illustrated at an opposite end of the pylon 302 from the rotor 304 is a rotor disc-brake system 310, which is also coupled to the rotor mast and will be described in more detail below.

Figure 4A:
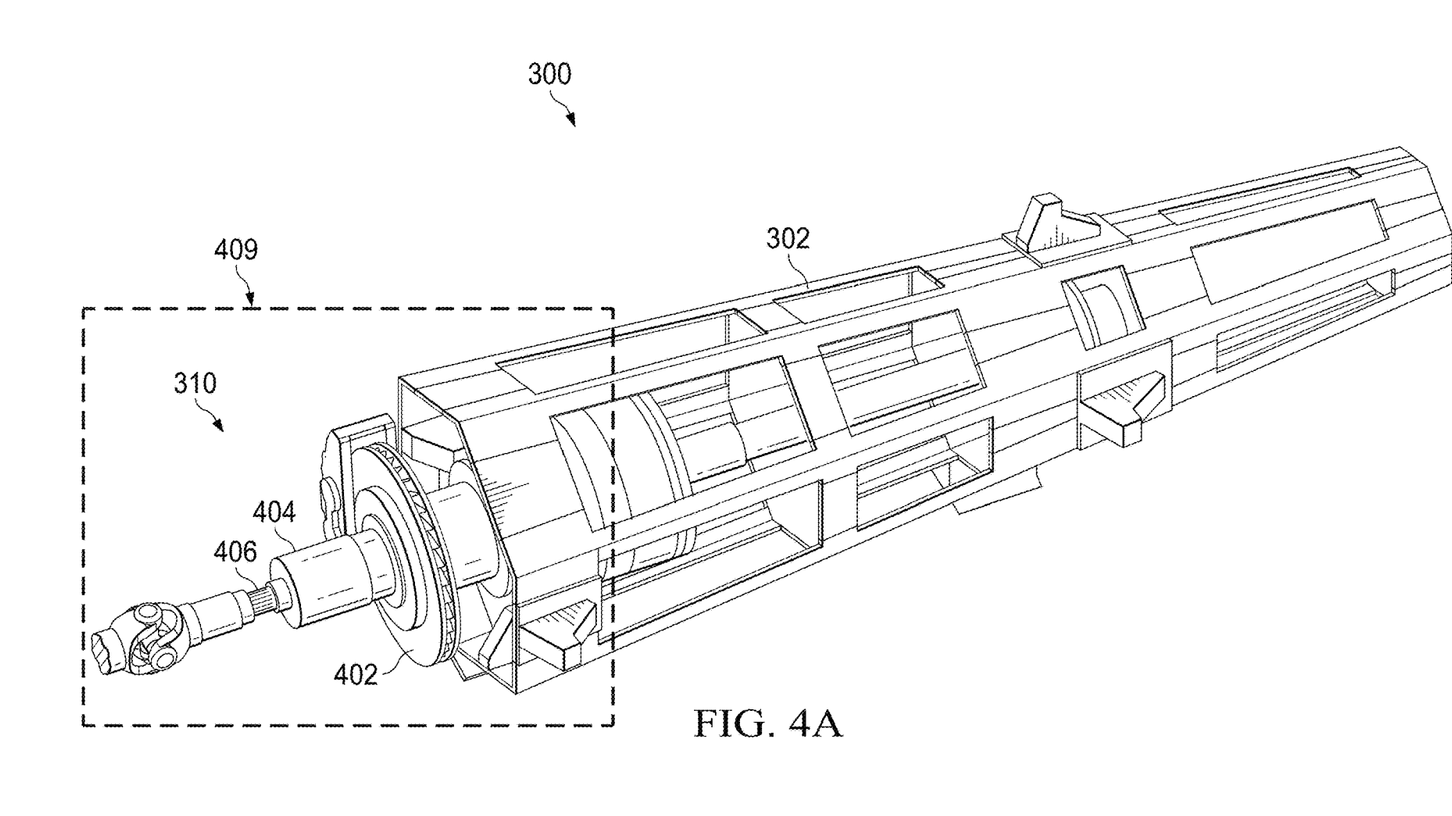
FIG. 4A illustrates the rotor-regulation system of FIG. 3 in more detail.
Figure 4B:
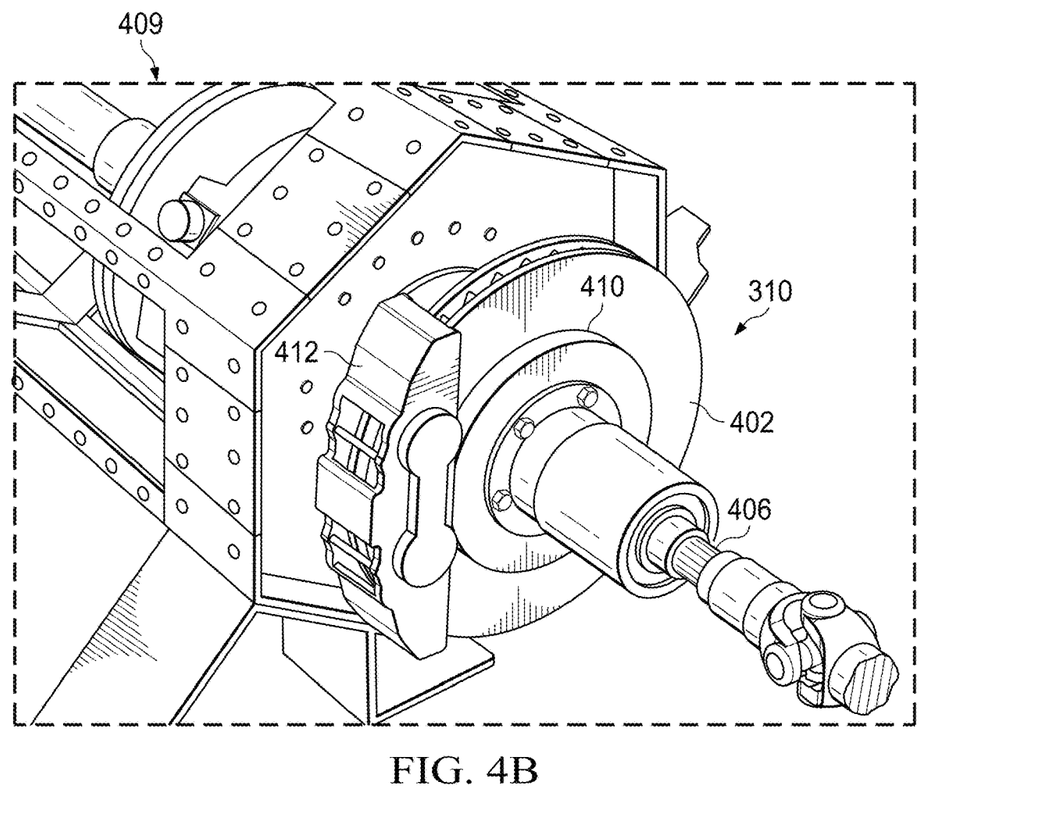
FIG. 4B illustrates a disc-brake system of FIG. 4A in more detail.
Figure 5:
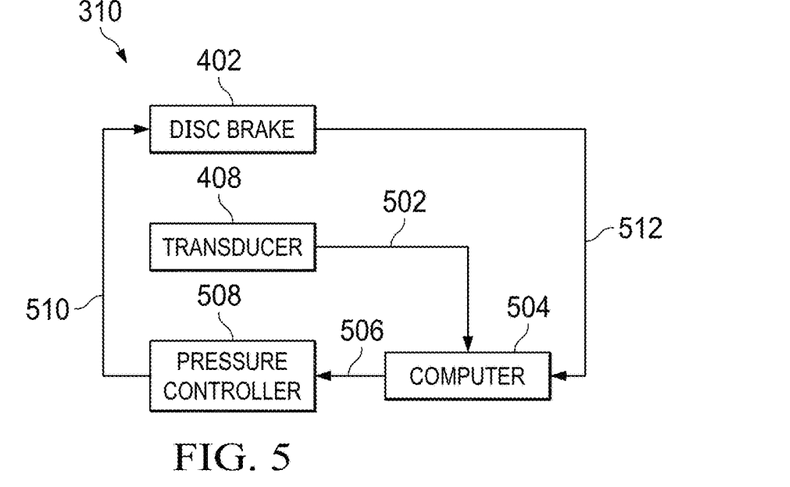
FIG. 5 is a functional block diagram that illustrates operation of the disc-brake system.

The rotor disc-brake system 310 is shown and described in more detail in FIGS. 4A-B and FIG. 5. FIG. 4A illustrates the rotor-regulation system 300 from the end of the pylon 302 opposite the rotor 304 as illustrated in FIG. 3. The rotor disc-brake system 310 includes a disc brake 402 and a transducer 404, which may be, for example, a position transducer. The transducer 404 and the disc brake 402 are each coupled to the rotor mast referred to relative to FIG. 3, the rotor mast being designated by reference numeral 406. Although the rotor disc-brake system 310 is shown at an opposite end of the pylon 302 from the rotor 304, it should be understood that the rotor disc-brake system 310 need not be located in this location so long as it is capable of performing the functions described herein. Box 409 of FIG. 4A is shown in more detail in FIG. 4B from an opposite side of the pylon 302. The rotor 304 is not shown in FIGS. 4A-B for purposes of clarity.

FIG. 4B shows the rotor disc-brake system 310 in greater detail. The rotor disc-brake system 310 includes the disc brake 402, the transducer 404, and the rotor mast 406. The disc brake 402, which includes a disc 410 and a caliper 412, is used to arrest the rotor mast 406 in order to cause the rotor 304 to be positioned azimuthally in a correct indexing position so that, for example, the rotor blades 306(1), 306(2), and 306(3) can be folded toward the pylon 302 and held in place by the stow locks 308(1), 308(2), and 308(3) during wingborne flight. In a typical embodiment, the transducer 404 outputs a signal indicative of a rotational position of the rotor mast 406. In some embodiments, the transducer 404 measures one or both of rotor position error and angular velocity of the rotor mast 406.

FIG. 5 is a functional block diagram that illustrates operation of the rotor disc-brake system 310. The block diagram of FIG. 5 shows in block-diagram form the disc brake 402 and the transducer 404, each of which is coupled to the rotor mast 406, although the rotor mast 406 is not explicitly illustrated in FIG. 5. In a typical operation, the rotor disc-brake system 310 utilizes the transducer 404 to determine a rotational position of the rotor mast 406. The transducer 404 outputs a signal 502 (e.g., at least one of a position error signal and an angular-velocity signal) to a computer 504. Operation of the computer 504 is analogous to that described above relative to the computer 118. The computer 504 outputs a pressure command 506 responsive to at least the signal 502 and, in some embodiments, on other inputs as well. In a typical embodiment, an analogous controller topology to that discussed above relative to FIG. 2 could be employed in which pressure commands rather than flow-restriction commands are utilized. The pressure command 506 is output to a pressure controller 508. In a typical embodiment, the pressure controller 508 is incorporated into the computer 504; however, in some embodiments, the pressure controller 508 and the computer 504 are separate components. The pressure controller 508 serves to monitor output pressure and adjust a hydraulic valve appropriately to match a commanded pressure. The pressure controller 508 is fed by a supply pressure. Responsive to the pressure command 506, the pressure controller 508 modulates pressure applied to the caliper 412 of the disc brake 402 via a pressure-modulation signal 510 and, in a typical embodiment, an associated hydraulic valve, which is not shown and may be integrated in the disc brake 402 or the pressure controller 508, in order to control rotation of the rotor mast 406 and, consequently, an azimuthal position of the rotor 304. A pressure-output signal 512 from the disc brake is fed back to the computer 504, typically via a transducer (not shown). Those having skill in the art will recognize that pressure feedback will typically be provided to whichever component regulates pressure, whether that component may be, for example, the pressure controller 508 or if the pressure-control function is integrated into the computer 504. In some embodiments, such feedback wrap from the output 510 of the pressure controller 508 back into the pressure controller 508, whether internally or externally to the pressure controller 508.

It is thus apparent that the caliper 412 may be used to apply a braking torque onto the disc 410 attached to the rotor 304 via the rotor mast 406. In a typical embodiment, the computer 504 is operable to monitor at least one of the speed and position of the rotor 304 via the transducer 404. Pressure exerted by the caliper 412 on the disc 410 is determined by the computer 504, based, for example, on at least rotor-indexing position error. The pressure controller 508 regulates the caliper 412 to the commanded pressure. The rotor disc-brake system 310 regulates at least one of deceleration, speed, and final position of the rotor 304 to at least approach the correct indexing location.

In a typical embodiment, the disc brake 402 modulates a braking torque to the rotor 304 and, in some cases, the engine. In other cases, due to clutching operations, no residual engine torque is transmitted to the rotor mast 406. In some embodiments, the rotor disc-brake system 310 causes the rotor 304 to approach but not completely reach a final desired indexing position; in such cases, a rotor lock, which would typically include a plurality of V blocks around the mast 102, rotor-blade feathering adjustments, and engine torque adjustments may be used to guide the rotor 304 toward the final desired indexing position. Thus, a slow rotational rate may be maintained that is sufficient that motion of the rotor lock can be coordinated to move into position as lock pins pass by an engagement range of V blocks of the rotor lock and force a final precision alignment of the rotor as entire rotor lock engages.

A mast lockout system is described in detail in U.S. Pat. No. 10,875,640, which patent is incorporated herein by reference. While FIG. 2B of U.S. Pat. No. 10,875,640 shows two locking pins aligning with two V blocks, it will be understood that if, for example, a given aircraft has three rotor blades, three locking pins and three V blocks could be used to provide three possible final indexing locations such that any rotor blade could be folded and aligned to any stow lock.

In a typical embodiment, the rotor 304 is designed to slowly rotate, via a slight negative feathering bias, in an opposite direction of the direction in which it rotates during normal, rotor powered flight operation. In such a situation, engine idle may be increased so that the net torque makes the rotor 304 spin slowly in a positive (e.g., normal flight) direction. The rotor disc-brake system 310 is then used to cause the rotor 304 to get close enough and slow down enough or completely position the rotor 304 so that the rotor lock can lock the rotor 304 into the final indexing position. The rotor disc-brake system 310 can arrest the rotor 304 in response to prevailing net positive or negative torque.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A rotor-regulation indexing system for use in wing-borne flight, the rotor-regulation indexing system comprising:
   a rotor comprising a plurality of rotor blades;
   a rotor mast operable to drive the rotor; and
   a rotor disc-brake system operable to modulate rotation of the rotor mast and stop the rotor mast at a desired azimuthal position during the wing-borne flight;
   wherein the rotor disc-brake system comprises:
      a transducer operable to monitor rotation of the rotor mast; and
      a disc brake comprising a disc and a caliper.

2. The rotor-regulation indexing system of claim 1, wherein the transducer monitors at least one of angular velocity and position error of the rotor mast.

3. The rotor-regulation indexing system of claim 1, wherein the rotor-regulation system recognizes a direction of rotor rotation and is operable to perform at least one of indexing and biasing of the rotor in either a clockwise or a counter-clockwise direction.

4. The rotor-regulation indexing system of claim 1, comprising:
   a computer operably coupled to the transducer; and
   wherein the computer outputs a pressure controller command responsive, at least in part, to a signal output by the transducer.

5. The rotor-regulation indexing system of claim 4, comprising:
   the pressure controller; and
   wherein the pressure controller outputs a pressure-modulation signal to the disc brake to modulate rotation of the rotor mast.

6. The rotor-regulation indexing system of claim 5, comprising a rotor lock operable to lock one of the plurality of rotor blades in an indexed and unfolded position.

7. The rotor-regulation indexing system of claim 6, wherein the rotor lock is operable to restrain the rotor in the event of a failure of the rotor disc-brake system.

8. A rotor disc-brake indexing system for use in wing-borne flight, the rotor disk-brake indexing system comprising:
   a disc brake comprising a disc and a caliper and operable to modulate rotation of a rotor mast and stop the rotor mast at a desired azimuthal position during the wing-borne flight;
   a transducer operably coupled to the rotor mast; and
   a computer operably coupled to the transducer.

9. The rotor disc-brake indexing system of claim 8, wherein the transducer outputs at least one of a signal that indicates rotor position and a signal that indicates angular velocity of the rotor mast.

10. The rotor disc-brake indexing system of claim 8, wherein an engine driving the rotor mast supplies residual torque to the rotor.

11. The rotor disc-brake indexing system of claim 8, comprising:

wherein the rotor disc-brake system is interoperably coupled to a rotor lock to lock in a final, indexed position of the rotor coupled to the rotor mast; and wherein the rotor lock is operable to restrain the rotor in the event of failure of the disc-brake rotor system.

12. The rotor disc-brake indexing system of claim 8, comprising a pressure controller operable to receive a pressure command.

13. The rotor disc-brake indexing system of claim 12, wherein the pressure controller is operable to control the disc brake via a hydraulic valve.

14. An indexing method of modulating rotation during wing-borne flight of a rotor comprising a plurality of rotor blades, the method comprising:

receiving information indicative of at least one of a position and rate of angular rotation during the wing-borne flight of a rotating rotor coupled to a rotor mast; and responsive to the received information, modulating rotation of the rotor and stopping the rotor mast at a desired azimuthal position during the wing-borne flight via a disc-brake system comprising a disc and a caliper and coupled to the rotor mast.

15. The indexing method of claim 14, wherein the received information comprises a signal output by a transducer operably coupled to the rotor mast.

16. The indexing method of claim 14, wherein the modulating comprises monitoring, by a transducer operably coupled to the rotor mast, of rotation of the rotor mast.

17. The indexing method of claim 16, wherein the modulating comprises the transducer outputting, responsive to the monitoring, a signal to a computer.

18. The indexing method of claim 17, wherein the modulating comprises the computer:

receiving the signal; and adjusting a pressure command responsive, at least in part, to the signal.

19. The indexing method of claim 18, wherein the modulating comprises regulating pressure of the disc brake of the disc-brake system responsive to the adjusting.

* * * * *